Patented Apr. 6, 1937

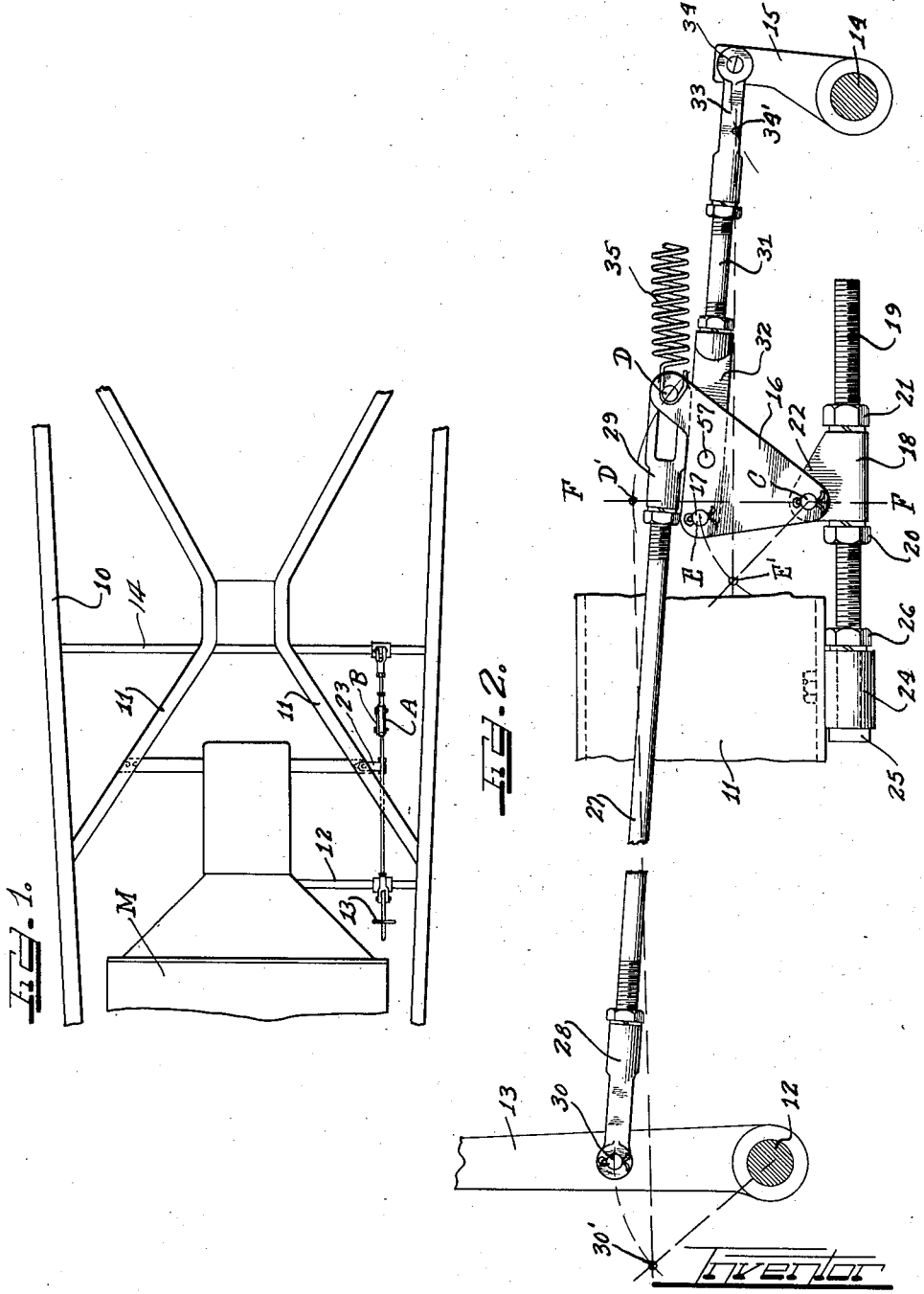

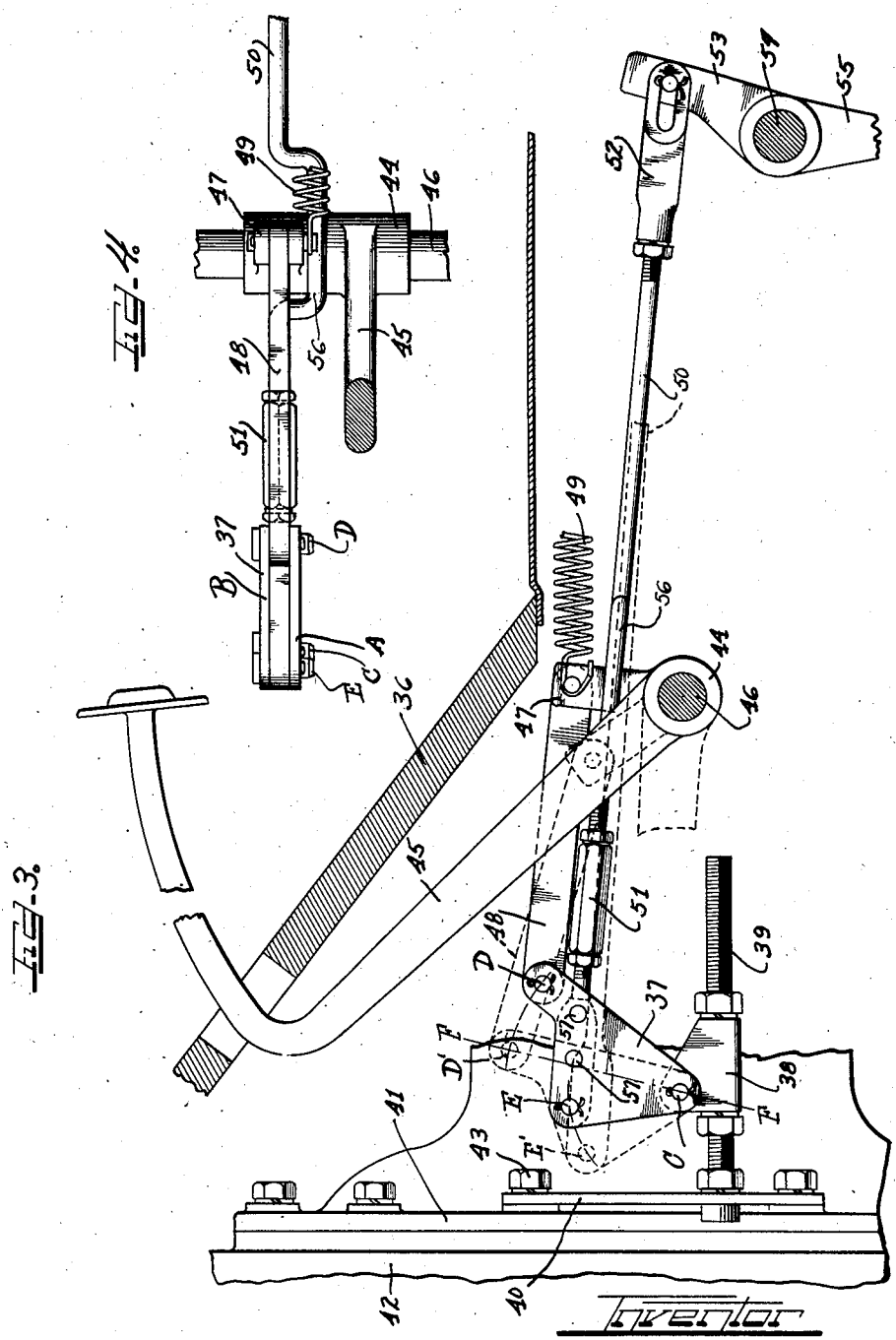

2,076,047

UNITED STATES PATENT OFFICE 2,076,047

BRAKE LEVERAGE STRUCTURE

William C. Scott, Chicago, Ill.

Application November 18, 1935, Serial No. 50,380

7 Claims. (Cl. 188—196)

My invention relates to braking leverage structure and particularly to a leverage assembly for interposition between the brake lever pedal and the lever shaft which is connected to the various brake rods leading to the brake structures at the various wheels of a vehicle, particularly an automotive vehicle, the object of the invention being to provide a leverage assembly which will materially reduce the necessary pressure against the brake pedal lever and will progressively increase or multiply such pressure for corresponding powerful pull effort on the brake rods and resultant braking effort of the wheel brake structures.

More in detail, the object of the invention is to provide a leverage assembly comprising a V-lever element having a long lever leg and a short lever leg at opposite sides of a line extending between the levers and through the pivot axis of the lever element, with the longer lever arm on the brake rod side and the shorter lever arm on the pedal side and with the long lever connected with the pedal lever and the short lever arm connected with the brake rod structure so that as the brake pedal is swung forwardly the leverage arm of the longer lever leg will increase in length while the leverage arm of the shorter lever leg will decrease in length whereby the pull exerted by the force applied to the brake pedal will be rapidly multiplied for application of correspondingly multiplied power to the brake rods leading to the brake structures.

The various features of my invention are incorporated in the structures disclosed on the accompanying drawings, in which drawings—

Figure 1 is a more or less diagrammatic plan view of the chassis frame and engine mounting of an automotive vehicle showing my improved brake leverage system applied;

Figure 2 is an enlarged side elevation of the leverage assembly interposed between a brake pedal lever and a brake rod controlling shaft;

Figure 3 is a side elevation showing parts of another type of vehicle structure and a modified arrangement of the leverage assembly; and Figure 4 is a plan view of the leverage assembly.

Referring to Figure 1 the chassis frame 10 has cross beam structure 11 for supporting the rear end of the engine structure M, a shaft 12 carrying the brake pedal lever 13 and a cross shaft 14 having lever arms spaced thereon for connection with the various brake rods (not shown) leading to the various brake structures at the vehicle wheels. The usual connection has been to extend an ordinary rod from the brake pedal to a lever arm 15 extending from the brake rod shaft 14. In accordance with my invention, I interpose my improved leverage assembly between the brake pedal and the brake rod shaft.

The leverage assembly shown comprises a V-lever element 16 which, as shown, may be in the form of two similar plates A and B of suitable metal. The plates may be held in alignment by pivot pins C, D and E detachably extending through suitable openings 17 through the plates, the pin C being at the point of the lever structure and the pins D and E being at the ends of the lever legs C—D and C—E, the leg C—D being longer than the leg C—E.

The lever element is mounted on a supporting block 18 which is slidable on a screw rod 19 and held in adjusted position thereon by nuts 20 and 21 threading on the rod, the upstanding flange 22 on the block 18 forming a spacer between the plates A and B and receiving the pivot pin C so that the lever element may swing on the supporting block.

A supporting bracket or plate 23 may be secured against the underside of one of the beams of the cross beam structure 11 shown in Figure 1, the supporting plate having an enlarged outer end 24 through which the end of the rod 19 extends, the end 24 being clamped between the head 25 of the rod 19 and a nut 26 threading on the rod.

In the normal position of the leverage assembly the leverage legs C—D and C—E are at opposite sides of an intermediate line indicated by F—F, the shorter lever leg C—E being on the brake pedal side of the line and the longer lever leg C—D being on the brake rod side of the line. The brake pedal lever is connected with the long lever arm C—D as by a connecting link structure comprising a rod 27 in whose ends clevis members 28 and 29 have adjustable threaded connection, the clevis 28 being pivoted at 30 to the pedal lever 13 a distance above the shaft 12, while the clevis member 29 at its outer end extends between and forms a spacer for the plates A and B of the lever element 16 and receives the pin D. The shorter lever arm C—E of the lever element is connected with the lever 15 on the brake rod shaft 14 by a link structure comprising a rod 31 and clevis members 32 and 33 having adjustable threaded engagement with the rod ends, the member 32 extending between the plates A and B of the lever element 16 to receive the pin E, while the clevis member 33 is connected by a pin 34 with the end of the lever 15.

A tension spring 35, which at its front end may hook around the pin D, is anchored at its rear end to some suitable stationary support on the vehicle and the spring tends to hold the leverage structure in its normal position with the brake lever pedal in its forward position, the inner ends of the link structures 29 and 32 being then in abutment as clearly shown on Figure 2. The line F—F passes through the axis of the pivot pin C of the lever element 16 and when, upon depression of the brake pedal, the lever element 16 is swung forwardly to bring its lever leg C—D into coincidence with the line F—F, the line structure 27 which then extends between the points D' and 30' will be substantially at right angles with the line F—F for maximum leverage conditions of the lever leg C—D. Upon such forward swing of the lever element 16, the lever arm of the lever leg C—D, measured by the perpendicular from the fulcrum point C to the link element 27, is progressively increased until the maximum lever arm C—D' is reached, while at the same time the lever arm of the lever leg C—E, which moves away from the line F—F to bring the link 31 into the position E'—34', is reduced in length, the result being a multiplication by the leverage element of the force applied to the brake pedal and consequent powerful rotation of the shaft 14 and the link rods connected therewith for transmission to the brake structures associated with the vehicle wheels. Thus operation of the brake pedal under a comparatively light pressure will result in the application of powerful braking force. By means of the adjustable support for the lever element 16 and the adjustability of the linkages 27 and 31, accurate adjustment and setting may be made for the proper normal positions of the parts.

The modified arrangement shown in Figures 3 and 4 is adapted particularly for installation on types of vehicles where access may be had to the leverage only at the front part of the vehicle body below the footboard 36. The V-lever element 37 is substantially the same as the lever element 16 of Figures 1 and 2 and is pivoted on a block 38 adjustably mounted on a screw rod 39 which extends from a plate 40 which may be conveniently supported on the flange 41 of the clutch housing 42 of the motor structure, the plate being readily secured by a number of the flange securing screws 43.

The lever element 37 has the longer rear lever leg C—D and the shorter front lever leg C—E at opposite sides of a line F—F passing through the fulcrum C. The hub 44 of the pedal lever 45 is mounted on the shaft 46, an arm 47 being offset laterally on the hub from the lever 45 and extending upwardly and connected by a link 48 with the pin D of the lever element 37 so that when the pedal lever is swung forwardly the lever element 37 will be swung forwardly, such movement being resisted by the spring 49.

A link rod 50 is connected at its forward end to a turnbuckle 51 with the pin E on the lever element and at its rear end the link has a clevis 52 connecting with the lever 53 on the brake rod shaft 54 which has other levers 55 connecting with the brake rods (not shown) leading to the various wheels. The link 50 has an offset portion 56 which extends between the levers 45 and 47. When the brake pedal is pushed down and the lever element 37 is swung forwardly the shaft 54 will be rotated for transmission of power to the brakes. As the lever element 37 is swung forwardly to bring the lever leg C—D into coincidence with the line F—F, this line will be at right angles with the direction of push through the link 48 and the leg C—D will be at maximum leverage arm. The lever arm of the lever leg C—E decreases as the lever leg moves away from the line F—F and the result is a material increase or multiplication of the power exerted against the brake pedal, and this multiplied power is transmitted through the link 50 to the shaft 54 and to the brake structure.

In some types of vehicles the brake lining is of more or less yielding woven material which becomes compressed with use, and with these types of brakes the leverage multiplication need not be so great for a period of operation of the vehicle, but after the brake lining becomes more or less compressed and set the leverage should be increased. For adjusting for such conditions the lever element 37 may be provided with additional openings 57 for receiving the pivot pin E for the link structure 50. During the preliminary period of operation of the vehicle the connection of the linkage could be made at the rearmost opening 57 for reduced leverage multiplication, then after a period of use the linkage could be moved up to the next opening 57 and after the brake linings had been thoroughly broken in the linkage 50 could be connected with the foremost pin opening for maximum leverage multiplication. Such adjustment can readily be made by means of the turnbuckle 51.

I have shown practical and efficient embodiments of the various features of my invention and I do not desire to be limited to the exact construction, arrangement and operation shown and described as changes and modifications may be made without departing from the scope of the invention.

I claim as my invention:

1. The combination with the brake pedal and the brake rod structure in an automotive vehicle, of a V-lever element fulcrumed at its point with one of its lever legs longer than the other, said legs being relatively immovable and at opposite sides of an intermediate line passing through the lever fulcrum point, the longer lever leg being on the brake rod structure side of the intermediate line and the shorter lever leg being on the brake pedal side of the intermediate line, a connecting link connecting the brake pedal with the end of the longer lever leg and another link connecting the end of the shorter lever leg with the brake rod structure whereby the force applied to the brake pedal lever is multiplied for application to the brake rod structure, the points of connection of said links with the lever leg ends being fixed on said lever element relative to its fulcrum point.

2. The combination with the brake pedal lever and the brake rod structure of an automotive vehicle, of a V-lever element fulcrumed at its apex and having one lever leg longer than the other, said legs being relatively immovable, a link connection between said brake lever pedal and the end of the longer lever leg, and a link connection between the end of the shorter lever leg and the brake rod structure, the arrangement being such that swing of the brake pedal lever will cause swing of the lever element for increase in the lever arm of the longer lever leg and decrease in the lever arm of the shorter lever leg whereby the force applied to the brake pedal lever will be multiplied for application to the brake rod structure, the points of connection of said links with the lever leg ends being fixed on said lever element relative to its fulcrum point.

3. The combination with the brake rod structure in an automotive vehicle, of a V-lever element fulcrumed at its apex and having relatively immovable lever legs with its rear lever leg longer than its front lever leg, a link connection between the end of the longer lever leg and the brake pedal lever, and a link connecting the end of the shorter lever leg with the brake rod structure, the arrangement being such that when the brake pedal lever is depressed said lever element will be swung forwardly for actuation of the brake rod structure, said lever legs being normally at opposite sides of an intermediate line passing through the lever fulcrum, the lever connection between the brake pedal lever and the longer lever leg being such that when said longer leg is swung towards the intermediate line its lever arm will increase while the lever arm of the shorter lever leg will decrease as such leg swings away from the intermediate line, whereby the power applied to the brake pedal lever will be multiplied for application to the brake rod structure, the points of connection of said links with the lever leg ends being fixed on said lever element relative to its fulcrum point.

4. The combination with the brake pedal lever and the brake rod structure of an automotive vehicle, of a V-lever element fulcrumed at its apex and having relatively immovable lever legs with one lever leg longer than the other, a link connection between said brake lever pedal and the end of the longer lever leg, and a link connection between the end of the shorter lever leg and the brake rod structure, the arrangement being such that swing of the brake pedal lever will cause swing of the lever element for increase in the lever arm of the longer lever leg and decrease in the lever arm of the shorter lever leg whereby the force applied to the brake pedal lever will be multiplied for application to the brake rod structure, and means for adjusting the connections of said links with said lever element for increasing or decreasing the lever arm ratio, the points of connection of said links with said lever legs remaining fixed on said lever element relative to its fulcrum point during operation of the structure.

5. The combination with the brake pedal lever and the brake rod structure of an automotive vehicle, of a V lever element fulcrumed at its apex and having one lever leg longer than the other, a link connection between said brake lever pedal and the end of the longer lever leg, and a link connection between the end of the shorter lever leg and the brake rod structure, the arrangement being such that swing of the brake pedal lever will cause swing of the lever element for increase in the lever arm of the longer lever leg and decrease in the lever arm of the shorter lever leg whereby the force applied to the brake pedal lever will be multiplied for application to the brake rod structure, and means for adjusting the angle between said lever legs whereby to increase or decrease the lever arm ratio, the points of connection of said links with said lever legs remaining fixed on said lever element relative to its fulcrum point during operation of the structure.

6. The combination in an automotive vehicle with the brake pedal and its supporting shaft and the brake rod structure cross shaft rearwardly thereof, of a V lever element located in front of the brake pedal supporting shaft and fulcrumed at a point from which two lever legs extend normally respectively in front and rear of a line drawn through said fulcrum point, a thrust connection between the brake pedal and the rear lever leg and a pull connection between the brake rod structure cross shaft and the front lever leg, whereby normal downward movement of the brake pedal rotates the lever element about its fulcrum and causes the lever arm of the rear lever leg to be increased and the lever arm of the front lever leg to be decreased so that power supplied to the brake pedal is multiplied for application to the brake rod structure.

7. The combination in an automotive vehicle with the brake pedal lever and the brake rod structure cross shaft rearwardly thereof, of a support on the clutch housing of the vehicle driving means, a V lever pivoted at its apex on said support with its two lever legs normally inclined respectively in front of and to the rear of a line drawn through said fulcrum point, a connecting link between the brake pedal lever and the rear lever leg, and a connecting link between the brake rod structure cross shaft and the front lever leg, whereby upon normal downward movement of the brake pedal lever the lever arm of said rear lever leg will be increased and the lever arm of said front lever leg will be decreased so that the force applied to the brake pedal lever is multiplied for application to the brake rod structure.

WILLIAM C. SCOTT.